(12) United States Patent
Matter et al.

(10) Patent No.: US 7,380,085 B2
(45) Date of Patent: May 27, 2008

(54) MEMORY ADAPTED TO PROVIDE DEDICATED AND OR SHARED MEMORY TO MULTIPLE PROCESSORS AND METHOD THEREFOR

(75) Inventors: Eugene P. Matter, Folson, CA (US); Ramkarthik Ganesan, Fair Oaks, CA (US)

(73) Assignee: Intel Corporation, Santa Clara, CA (US)

( * ) Notice: Subject to any disclaimer, the term of this patent is extended or adjusted under 35 U.S.C. 154(b) by 286 days.

(21) Appl. No.: 10/003,170

(22) Filed: Nov. 14, 2001

(65) Prior Publication Data

US 2003/0093628 A1 May 15, 2003

(51) Int. Cl.
*G06F 12/00* (2006.01)
(52) U.S. Cl. ............... 711/170; 711/150; 711/153; 711/147
(58) Field of Classification Search ........... 711/147, 711/150, 151, 152, 163, 148, 149, 153
See application file for complete search history.

(56) References Cited

U.S. PATENT DOCUMENTS

| | | | | |
|---|---|---|---|---|
| 4,875,157 A | | 10/1989 | Frimmel, Jr. et al. | |
| 4,930,066 A | * | 5/1990 | Yokota | 711/149 |
| 5,140,681 A | * | 8/1992 | Uchiyama | 395/425 |
| 5,293,622 A | * | 3/1994 | Nicholson et al. | 710/52 |
| 5,636,361 A | * | 6/1997 | Ingerman | 395/477 |
| 5,659,715 A | * | 8/1997 | Wu | 711/170 |
| 5,875,464 A | * | 2/1999 | Kirk | 711/129 |
| 5,884,055 A | | 3/1999 | Tung et al. | |
| 5,911,149 A | * | 6/1999 | Luan et al. | 711/147 |
| 5,950,228 A | | 9/1999 | Scales et al. | |
| 5,950,288 A | | 9/1999 | Bach Lahor | |
| 6,088,770 A | * | 7/2000 | Tarui | 711/148 |
| 6,212,607 B1 | * | 4/2001 | Miller et al. | 711/149 |
| 6,216,178 B1 | | 4/2001 | Stracovsky et al. | |
| 6,266,751 B1 | | 7/2001 | Niescier | |
| 6,314,499 B1 | * | 11/2001 | Kermani | 711/147 |
| 6,493,800 B1 | * | 12/2002 | Blumrich | 711/129 |
| 2002/0016891 A1 | * | 2/2002 | Noel et al. | 711/153 |
| 2002/0052914 A1 | * | 5/2002 | Zalewski | 709/203 |
| 2002/0184445 A1 | * | 12/2002 | Cherabuddi | 711/130 |
| 2003/0065886 A1 | * | 4/2003 | Olarig et al. | 711/129 |
| 2003/0084247 A1 | * | 5/2003 | Song et al. | 711/128 |

FOREIGN PATENT DOCUMENTS

| | | |
|---|---|---|
| EP | 0 856 796 A2 | 3/1997 |
| WO | WO0177820 A3 | 10/2001 |

* cited by examiner

*Primary Examiner*—Kimberly McLean-Mayo
(74) *Attorney, Agent, or Firm*—Cool Patent, P.C.; Kenneth J. Cool

(57) ABSTRACT

Briefly, in accordance with one embodiment of the invention, a portable communication device may have multiple processors and a memory. Portions of the memory may only be accessible by one of the processors.

7 Claims, 2 Drawing Sheets

MEMORY ADAPTED TO PROVIDE DEDICATED AND OR SHARED MEMORY TO MULTIPLE PROCESSORS AND METHOD THEREFOR

BACKGROUND

As the features and functionality of communication or computing systems increase it is often desirable to design such systems with more that one processor. Multi-processor systems may be desirable because then the processors may be tailored to specialize in particular tasks. For example, a digital signal processor that performs mathematically intense computations may be combined with an application processor that may be used to execute user applications.

Conventional systems that involve more than one processor may have multiple memory devices that are each dedicated to one processor; the memory being used to store data and/or instructions for the processors. Separate, dedicated memory systems are typically used to reduce the risk of access conflicts that might arise should two processors have to access a shared memory at the same time.

However, the use of dedicate memory devices for each processor may increase the size, complexity, and cost of the overall system. Thus, there is a continuing need for better ways to share memory in a system have two or more processors.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
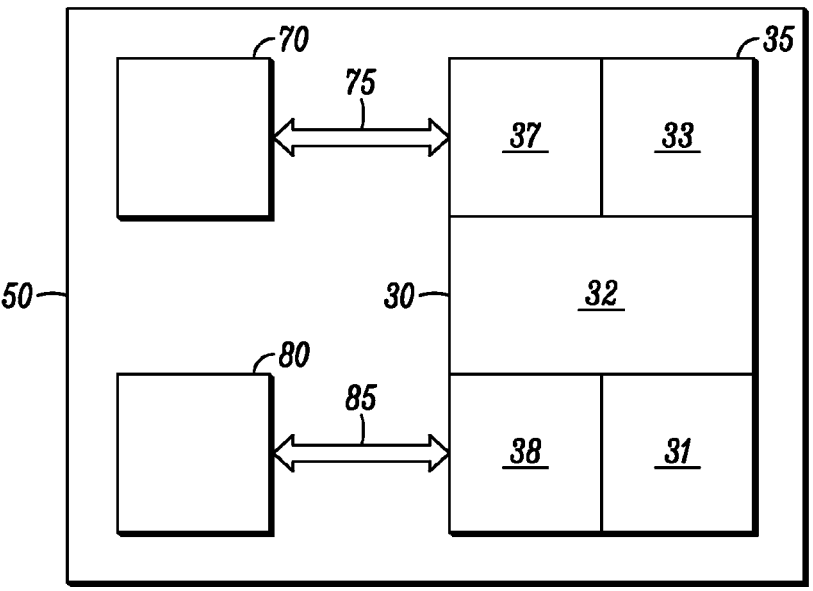
FIG. 1 is a block diagram of a portable communication device in accordance with an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Turning to FIG. 1, an embodiment 100 in accordance with the present invention is described. Embodiment 100 may comprise a portable computing or portable communication device 50 such as a mobile communication device (e.g., cell phone), a two-way radio communication system, a one-way pager, a two-way pager, a personal communication system (PCS), a portable computer, or the like. Although it should be understood that the scope and application of the present invention is in no way limited to these examples.

Portable communication device 50 may comprise two or more processors 70 and 80 that may be, for example, a microprocessor, a central processing unit (CPU), a digital signal processor, a microcontroller, a reduced instruction set computer (RISC), a complex instruction set computer (CISC), or the like. However, it should be understood that that the scope of the present invention is not limited to these examples, or by the number of processors in portable communication device 50. In addition, scope of the present invention is not limited to any particular combination of processors as processors 70 and 80 may be the same or different. It should also be understood that alternative embodiments may comprise three or more processors.

Portable communication device 50 may also comprise a memory device 30 that may include a memory array 35. Although the scope of the present invention is not limited in this respect, memory device 30 may be used to store data and or instructions to be executed by processors 70 and 80. Memory device 30 may comprise one or more memory types including, but not limited to, any type of disk storage including floppy disks, optical disks, CD-ROMs, magnetic-optical disks, read-only memories (ROMs), random access memories (e.g. static random access memories (SRAM), dynamic random access memories (DRAM), etc.), electrically programmable read-only memories (EPROMs), electrically erasable and programmable read only memories (EEPROMs), magnetic or optical cards, flash memory, or any other type of media suitable for storing electronic instructions and or data.

As will be explained in more detail below, memory array 35 may be divided up or allocated such that portions of memory array 35 (e.g. portions 31-33) are dedicated to processors 70 or 80. For example, although the scope of the present invention is not limited in this respect, portion 33 may be dedicated to processor 70 so that only processor 70 may access portion 33 of memory array 35 (i.e. processor 80 may not read or write to portion 33). Similarly, portion 31 of memory array 35 may be dedicated to processor 80 so that only processor 80 may access portion 31 of memory array 35 (i.e. processor 70 may not read or write to portion 31).

In addition, memory array 35 may optionally be allocated so that a portion 32 is accessible by both processors 70 and 80 (i.e. portion 32 of memory array 35 may be written to and read by both processors 70 and 80). Alternatively, portion 32 of memory array 35 may be allocated so that only one of processors 70 and 80 may write to portion 32, while only the other of processors 70 and 80 may read the contents of portion 32 of memory array 35. It should be understood that the portion of memory array 35 that is shared between processors 70 and 80 (e.g. portion 32) need not be physically or logically located between portions 31 and 33. Likewise there need not be only one shared portion and there could be multiple shared portions in alternative embodiments.

Although the scope of the present invention is not limited in this respect, portions 31-33 of memory device 30 may be adjacent or contiguous portion of memory array 35. In such an embodiment, portions 31-33 may share many of the signal or power supply lines used in the operation of memory device 30. For example, portions 31-33 may share the same clock signals, reset signals, sense amps, power supply voltage potential lines, etc.

Portable communication device 50 may also have memory buses 75 and 85 that may be used by processors 70 and 80, respectively, to access memory device 30. Buses 75 and 85 may be any combination of serial or parallel buses, and comprise any variety of signal lines such as data, addresses, power supply potentials, control signals, reset signals, chip select signals, although the scope of the present invention is not limited to any particular arrangement of composition of buses 75 and 85.

Although the scope of the present invention is not limited in this respect, memory device 30 may be a dual-port memory having ports 37 and 38. Ports 37 and 38 may be connected to buses 75 and 85 to permit processors 70 and 80 to access portions 33 and 31, respectively, of memory array 35 through the use of address, data, and control signals. Ports 37 and 38 may comprise decode logic that restrict processors 70 and 80 from accessing portion of memory array 35 that it is not authorize or permitted to access. For example, port 37 may ensure that portion 33 of memory array 35 is only accessible by processor 70, and port 38 may ensure that portion 31 of memory array 35 is accessible by processor 80. In addition, since portion 32 of memory array 35 may be accessed by both processors 70 and 80, ports 37 and 38 may both permit access to portion 32 as well.

Although the scope of the present invention is not limited in this respect, the use of dual-ports 37-38 and buses 75 and 85 may permit processors 70 and 80 to access portions 31 and 33 at the same time or substantially simultaneously. Likewise, ports 37-38 may permit one of portions 31 and 33 to be written to while the other is read, permit both to be written to at the same time, or permit both portions 31 and 33 to be read from at the same time.

During operation, portable communication device 50 may be able to alter the respective size of portions 31-33 depending on the operational load of processor 70, processor 80, or both. For example, if processor 70 is experiencing an operational mode that would benefit by a greater allocation of memory array 35, then memory device may increase the size of portion 33 and reduce the size of portion 32 and/or 31. Such a situation may arise if processor 70 is executing instructions that involve the use of large amounts of data. The situation may also occur is processor 70 is executing a variety of different user applications. It should understood that the operation load of processors 70 and 80 may depend on a number of factors such as the amount of data, the number of applications be executed by processors 70 and 80, or the nature of the instructions being executed. Accordingly, changes in allocation of memory array 35 may be made on any combination of these factors, although other facts may also be considered.

The varying or altering of the amount of memory array 35 that is allocated to portions 31-33 may be performed using a variety of techniques, although the scope of the present invention is not limited to these few enumerated. For example, portable communication device 50 may comprise a monitor (not shown in FIG. 1) that may constantly or periodically determine the operational load on processors 70 and 80 and instruct memory device 30 to make the appropriate changes in the amount of memory array 35 that is allocated to portions 31-33. Alternatively, memory device 30 may comprise monitoring logic to track the amount of memory array 35 that is historically been used or predict how much of memory array may be used in the near future. In yet another optional embodiment, processors 70 and/or 80 may monitor their own operational load and request more or less allocation of memory array 35 accordingly.

For illustrative purposes only, in one embodiment of portable communication device 50, processor 70 may be a CISC processor and processor 80 may be a DSP. Accordingly, portion 33 of memory array 35 may be used to store data and/or instructions associated with user applications (e.g. email, calendaring, etc.) or applications associate with the higher levels of abstraction in communication systems (e.g. layer 3 or layer 2). On the other hand, portion 31 of memory array 35 may be used to store data or instructions associated with base band processing of a communication system (e.g. layer 1). In addition, portion 32 may be used to store data or instructions to be used by both processor 70 and 80 (e.g. look-up tables, web pages, software codexes, etc.) or be used to store information to be shared or passed between processor 70 and processor 80. Although it should be understood that this example is just illustrative and the scope of the present invention is not limited in this respect.

Figure 2:
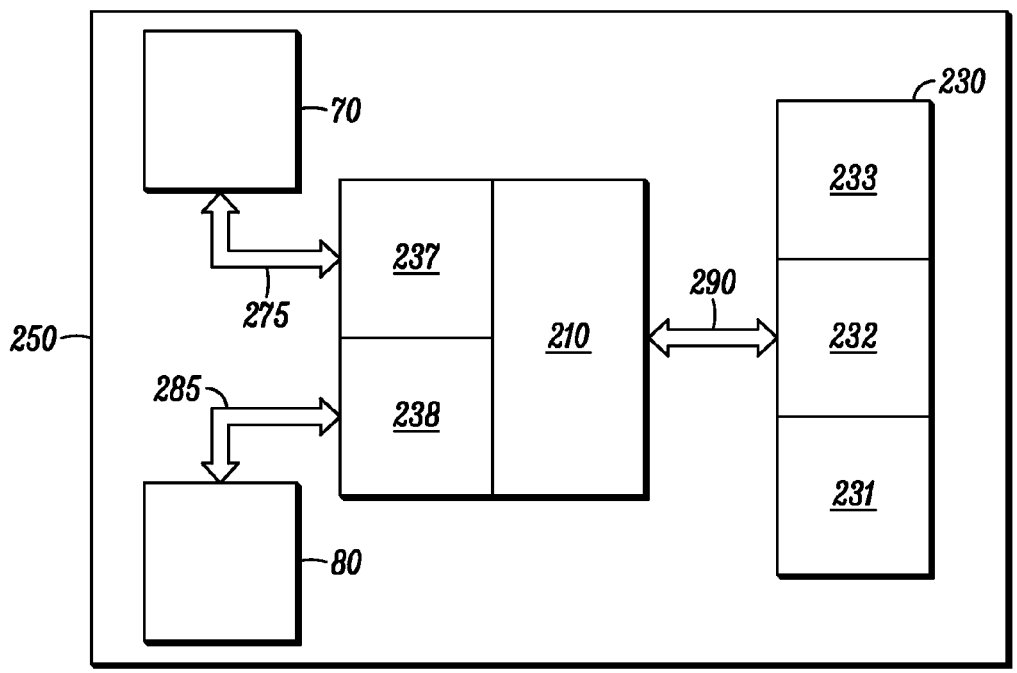
FIG. 2 is a block diagram of a portable communication device in accordance with an alternative embodiment of the present invention.

Turning now to FIG. 2, another embodiment 200 of the present invention is provided. In this particular embodiment, a portable communication device 250 has a memory device 230 that has allocated portions 231-233 that are accessed by processors 70 and 80. For example, portion 231 may only be accessible by processor 80, portion 233 may only be accessible by processor 70, and portion 232 may be accessible by both processor 70 and 80. Memory device 230 may comprise one or more of the memory types described earlier.

However, in this embodiment, a memory controller 210 is added to arbitrate and control access of memory device 230 by processors 70 and 80. Although the scope of the present invention is not limited in this respect, memory controller may be dual-ported or have ports 237-238 that may be used to control what portions of memory device 230 may be accessed by processors 70 and 80 through bus 290. Buses 275 and 285 may couple processor 70 and 80 to memory controller 210.

Memory controller 210 may contain logic and/or decode circuitry to determine if processors 70 and 80 are permitted to access various portions of memory device 230. Memory controller, may also comprise collision detection circuitry to resolve conflicts should processors 70 and 80 simultaneously attempt to access the same portion of memory device 230. The use of a memory controller 210 should be considered optional, but may be desirable to reduce the sophistication or cost associated with memory device 230. By moving the arbitration and conflict logic from memory device 230 to a separate component (i.e. memory controller 210) there may be greater flexibility in the type of memory that may be used for memory device 230.

Figure 3:
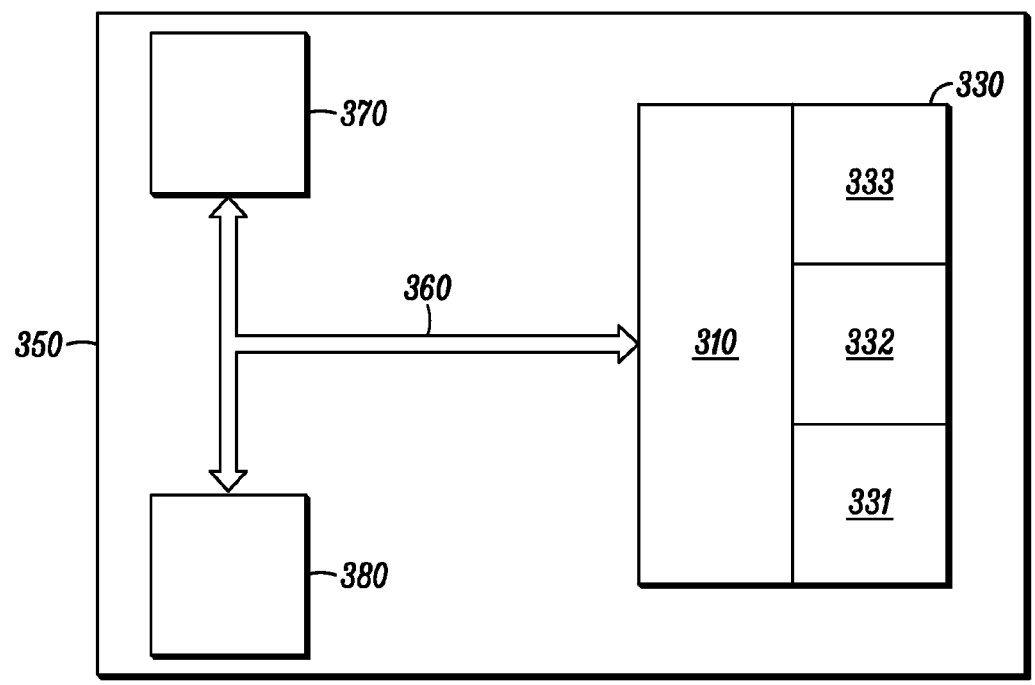
FIG. 3 is a block diagram of a portable communication device in accordance with yet another alternative embodiment of the present invention.

Turning now to FIG. 3, yet another embodiment 300 of the present invention is provided. In this embodiment 300, a portable communication device 350 may comprise a memory device 330 having two or more portions 331-333 that may be accessed by processors 370 and 380. For example, portion 331 of memory device 330 may only be accessible by processor 380, portion 333 may only be accessible by processor 370, and portion 332 of memory device 330 may be accessible by both processors 370 and 380, although the scope of the present invention is not limited in this respect. Memory device 330 may comprise one or more of the memory types described earlier.

Memory device 330 may also comprise an arbitrator 310 that may be used to control what portions 331-333 of memory device may be accessed by processors 270 and 280 over a memory bus 360. Memory bus 360 may be a serial or parallel bus comprising a variety of signal lines (e.g. data, address, chip select, etc.). Although the scope of the present invention is not limited in this respect, some of the signal lines within memory bus 360 may be shared or common with both processors 370 and 380. Thus, processors 370 and 380 may use memory bus 360 to access memory device 330.

Because the same memory bus 360 is used for multiple processors 370 and 380, arbitrator 310 may comprise logic to determine that processors 370 and 380 only access portions of memory device 330 that they are permit to access. In addition, arbitrator 310 may comprise collision detection circuit and resolution logic to handle situations where processor 370 and 380 are using memory bus 360 at the same time. One technique to reduce the amount of collisions that occur on memory bus 360 is to have processors 370 and 380 to listen to what is being transmitted over memory bus 360 and wait until memory bus 360 is available before transmitting, although this is just one example and the scope of the present invention is not limited in this respect.

Additionally and optionally, arbitration unit 310 may contain logic that may be used to decode the signals being sent by processor 370 and 380. For example, if arbitrator unit 310 is informed of what portions of memory device 330 that processors 370 and 380 are restricted to, arbitrator 310 may be able to permit processor 370 and 380 to access memory device 330 substantially simultaneously. For example, arbitrator 310 may use a packet or timed transmission system to permit processors 370 and 380 to transmit or receive simultaneously, although the scope of the present invention is not limited in this respect.

The use of arbitrator in 310 may be desirable in particular applications if the application is either layout or pin-count constrained. The use of a single memory bus 360 may make routing of signal lines throughout portable communication device 350 easier and reduce the need for more pins that would be associated with multiple buses.

While certain features of the invention have been illustrated and described herein, many modifications, substitutions, changes, and equivalents will now occur to those skilled in the art. For example, in alternative embodiments, the portable communication device may have three or more processors, and thus, the memory device may be divided into more regions that are accessible by only one of the processors. Additionally, the memory device or memory controller may have three or more ports. It is, therefore, to be understood that the appended claims are intended to cover all such modifications and changes as fall within the true spirit of the invention.

The invention claimed is:

1. An apparatus comprising:
an individual memory device including a memory array having a first portion and a second portion, the first portion of the memory array being different than the second portion of the memory array, wherein the memory array is adapted such that the first portion of the memory array is accessible only by a first processor and the second portion of the memory array is accessible only by a second processor, wherein the memory array further comprises a third portion that is different than the first portion and the second portion, the third portion of the memory array accessible by both the first processor and the second processor, and wherein the memory array is further adapted to dynamically alter a size of the first portion and the second portion of the memory array depending on an operational load of the first processor or the second processor.

2. The apparatus of claim 1, wherein the first portion and the second portion of the memory array are both coupled to a same clock signal.

3. The apparatus of claim 2, wherein the first portion and the second portion of the memory array are coupled to a same power supply potential.

4. The apparatus of claim 1, wherein the memory array is further adapted to increase the size of the first portion and decrease the size of the second portion due to an increase in the operational load of the first processor.

5. The apparatus of claim 1, wherein the memory array is further adapted such that the first processor may access the first portion of the memory array substantially simultaneously as the second processor accesses the second portion of the memory array.

6. The apparatus of claim 1, wherein the memory array is further adapted such that the first processor may read the first portion of the memory array as the second processor writes to the second portion of the memory array.

7. The apparatus of claim 1, wherein the memory array comprises memory selected from the group consisting of static random access memory, dynamic random access memory, read only memory, electrically erasable and programmable read only memory, and flash memory.

* * * * *